United States Patent [19]

Kleiber et al.

[11] 4,387,375
[45] Jun. 7, 1983

[54] TRANSMITTER FOR A NAVIGATION SYSTEM

[75] Inventors: Herbert Kleiber, Ludwigsburg; Horst Idler; Jürgen Stammelbach, both of Stuttgart, all of Fed. Rep. of Germany

[73] Assignee: International Standard Electric Corporation, New York, N.Y.

[21] Appl. No.: 282,341

[22] Filed: Jul. 10, 1981

[30] Foreign Application Priority Data

Aug. 1, 1980 [DE] Fed. Rep. of Germany ....... 3029169

[51] Int. Cl.³ .............................................. G01S 1/30
[52] U.S. Cl. ............................ 343/105 R; 343/106 R
[58] Field of Search ............... 343/105, 106 R, 106 D, 343/102

[56] References Cited

U.S. PATENT DOCUMENTS 3,979,751 9/1976 Van Den Berg ............... 343/106 R

Primary Examiner—Theodore M. Blum

Attorney, Agent, or Firm—John T. O'Halloran; Alfred C. Hill

[57] ABSTRACT

In navigation transmitters it is important that the phase difference between the carrier waves of a carrier signal and the carrier waves of sideband signals be held at a constant value. To accomplish this, the carrier waves are maintained constant relative to a reference signal in a known manner. A phase meter measures the phase difference between the carrier waves of the sideband signals and the reference signal and between the carrier waves of the carrier signal and the reference signal. The measure values are used to determine the phase difference between the carrier signal and sideband signals which are compared with a desired value. Depending on the deviation from the desired value, a controllable phase shifter controls the phase of the carrier waves of the sideband signals. Since the measurements are made on a time-division multiplex basis, little circuitry is required. Any measuring errors do not affect the formation of the desired phase difference.

6 Claims, 5 Drawing Figures

TRANSMITTER FOR A NAVIGATION SYSTEM

BACKGROUND OF THE INVENTION

The present invention relates to a transmitter and more particularly to a transmitter for a navigation system which transmits at least first and second signals and includes a phase regulator to control the phase of the first and second signals.

A transmitter of this kind is described in an article by H. Rüchardt entitled "Das Doppler-VOR-System", SEL-Nachrichten 16 (1968), No. 2, pp. 44 to 53. Section 2.1.2 describes the phase control between the output signals.

In some navigation facilities, different antennas radiate RF signals which are superimposed on each other in the radiation field. Only the signal obtained by the superposition can be used to determine the navigational information.

A Doppler-VOR or VOR ground station (VOR=VHF omnidirectional range), for example, emits carrier and sideband signals. The superposition of carrier and sideband signals in the radiation field gives an amplitude-modulated signal, with the amplitude of the resulting wave being dependent on the azimuth.

It is particularly important that a constant phase difference be set and maintained between the carrier and the sideband signals. Phase differences between different signals must also be held constant in other navigation systems, such as instrument-landing systems.

Phase differences are commonly regulated by means of phase-regulating circuits. Phase regulation per se is described, for example, in an article by K. D. Eckert entitled "Phasensynchronisation von HF-Oszillatoren gleicher und dicht benachbarter Frequenzen", Internationale Elektronische Rundschau 21 (1967), No. 6, pp. 153 to 157.

The conventional devices for regulating the phase difference between carrier and sideband signals permit precise regulation only if the sideband transmitter has a high stability itself. It then suffices to regulate the phase of the carrier relative to a reference signal. Since the high-frequency carrier wave of the sideband signals is reversed 180° in phase after each half-cycle of the audio-frequency modulating signal, the sign of the phase difference cannot be determined with the conventional phase regulators. This, however, is necessary if the phase of the carrier wave of the sideband signal is to be maintained constant.

SUMMARY OF THE INVENTION

An object of the present invention is to provide a transmitter for a navigation system wherein any constant phase difference can be set and maintained between the carrier waves of at least two signals to be transmitted.

A feature of the present invention is the provision of in a transmitter for a navigation system transmitting at least a first signal and a second signal, the first signal and the second signal each including carrier waves having a fixed phase relationship with respect to each other, a phase regulator comprising: at least two couplers each extracting a portion of a different one of the first and second signals; first means having one input coupled to the two couplers on a time division multiplex basis and the other input alternately coupled to a source of reference signal and a quadrature version of the reference signal; and second means coupled to the first means to form a ratio of a first voltage obtained by mixing the first and second signals with the reference signal and a second voltage obtained by mixing the first and second signals with the quadrature version of the reference signal, the ratio determining a phase shift between the carrier waves of the first and second signals and a carrier wave of the reference signal, to calculate from the phase shift a phase difference between the carrier waves of the first and second signals, to compare the calculated phase difference to the fixed phase relationship and to produce a control quantity of the basis of the comparison to control the phase of the carrier wave of at least one of the first and second signals.

The novel transmitter makes it possible to maintain any constant phase difference between several carrier waves in a simple manner. Any errors in determining the phase difference between a carrier wave of a signal to be radiated and the carrier wave of a reference signal do not affect the maintenance of a constant phase difference between the carrier waves of the signals to be radiated since they are equal for the individual measurements and, hence, have no effect on the phase difference to be held constant.

Since the phase measurements are made in the timedivision multiplex mode, only a small amount of circuitry is required. The phase differences between the carrier waves can be held at any constant value.

In a development of the present invention, the transmitter is so constructed that, in addition, the amplitudes of the signals to be transmitted are controlled.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
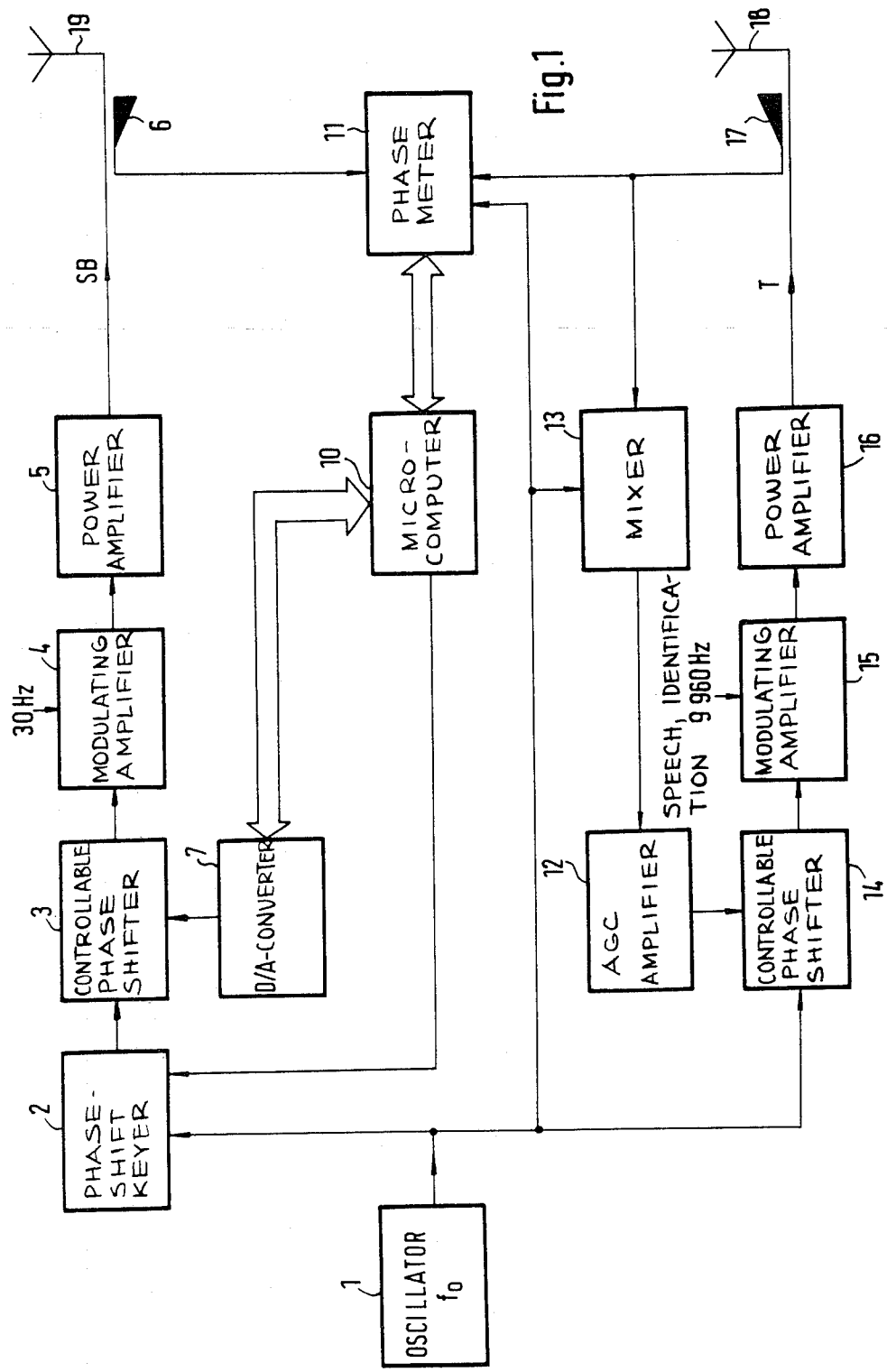
FIG. 1 is a block diagram of that portion of a transmitter which is essential for the understanding of the present invention.

In the transmitter of a VOR ground station, an oscillator 1 generates the carrer wave of frequency fo (fo lies between 108 MHz and 118 MHz), which is modulated at 30 Hz in a modulating amplifier 4 and with speech, identification, and the subcarrier (frequency 9,960 Hz) in a modulating amplifier 15. The modulated signals are amplified to the power to be radiated in power amplifiers 5, 16, and radiated from antennas 19, 18. The VOR ground station emits a carrier T and two sideband signals SB. For simplicity, the description will refer to only one sideband signal, which is radiated from the antenna 19.

The modulating amplifier 4 in the sideband-signal branch is preceded by a phase shift keyer 2 and a controllable phase shifter 3. In the phase shift keyer 2, which is controlled by a computer 10, the phase of the carrier wave is changed by $\pi$ after each half-cycle of the 30-Hz modulating signal.

The modulating amplifier 15 in the carrier branch is preceded by a controllable phase shifter 14. The components used in the carrier branch and in the side-band-signal branch have slightly different characteristics as a result of manufacturing variations, and the gain produced by the power amplifier is not always the same. To achieve a low distortion factor in spite of this, phase regulation is provided during carrier generation. This regulation will be explained only briefly, because it is known per se.

A directional coupler 17 couples out a small part of the carrier T and feeds it to a mixer 13, where it is mixed with the signal of frequency fo from the oscillator 1. The carrier wave of frequency fo is the reference signal. The mixed signal is applied to an AGC amplifier 12, in which the voltage of the mixed signal is compared with a reference voltage, e.g. O V. Depending on the result of the voltage comparison, the AGC amplifier 12 generates a control signal which controls the controllable phase shifter 14 in such a way that a phase difference of $\pi/2$ is maintained between the carrier waves of the carrier T and the reference signal fo. This phase regulation is provided continuously and independently of the instantaneous modulating voltage of the carrier.

As mentioned above, it is important that a constant phase difference be maintained between the carrier waves of the carrier and the sideband signals. The regulation proposed for this purpose will be explained in the following.

Part of the extracted carrier is applied not only to the mixer 13 but also to a phase meter 11. This phase meter is also fed with a part of the sideband signal SB, which is extracted by a directional coupler 6, and with the reference signal fo.

Figure 2:
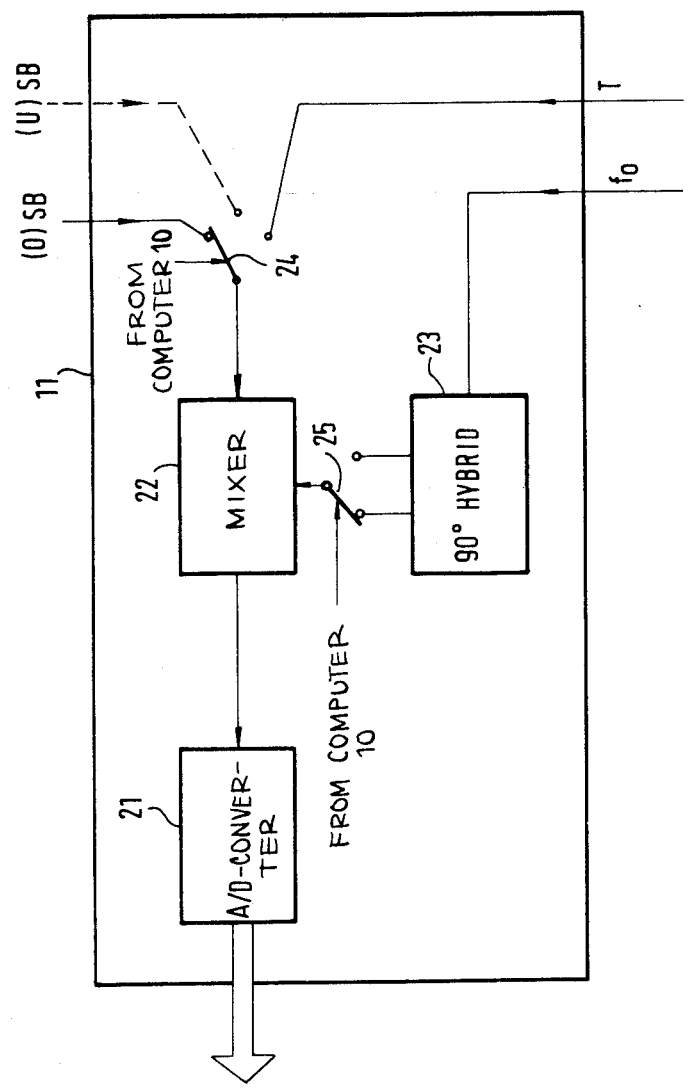
FIG. 2 is a block diagram of the phase meter of FIG. 1.

The phase meter 11 contains switches 24 and 25 controlled by a microcomputer 10 (FIG. 1), as will be explained in greater detail with the aid of FIG. 2. The first switch 24 applies one of the sideband signals (0)SB or (U)SB (only one of which is considered in FIG. 1) or the carrier T alternately to a mixer 22. The reference signal fo is applied to the mixer 22 via a 90° hybrid and the second switch 25. The mixer output signals are fed to an analog-to-digital converter 21. The amplitudes of the mixer output signals are functions of the phase differences between the carrier waves of the sideband signals and the reference signal and between the carrier wave of the carrier and the reference signal. As the signals are mixed, in the mixer 22, with the reference signal fo and the quadrature reference signal fo, two mixed signals are obtained for each sideband signal and for the carrier, namely $S = U \sin \Psi$, and
$S' = U \cos \Psi$, where S and S' is the mixed signal, U is the amplitude of the mixed signal, and $\Psi$ is the phase difference between the reference signal and the carrier waves of the other signals mixed with the reference signal.

By forming the ratio S/S, one obtains tan $\Psi$ and, thus, the phase difference to be determined, $\Psi$.

Since both switches 24 and 25 are controlled by the computer 10, the latter knows which signals were and are being mixed. An unambiguous assignment is possible.

The ratio S/S, is obtained in the computer 10. As at the beginning of the description, reference will only be made to one sideband signal.

In the computer 10, the following phase differences are known:

$\Delta\Psi_1 = \Psi_{SB} - \Psi_{reference}$ $\Delta\Psi_2 = \Psi_T - \Psi_{reference}$ This can be used to calculate the difference $\Delta\Psi$ between the phases of the carrier waves of the sideband signal and the carrier, which is to be held at a constant value.
$\Delta\Psi = \Delta\Psi_1 - \Delta\Psi_2$.

Figure 3A:
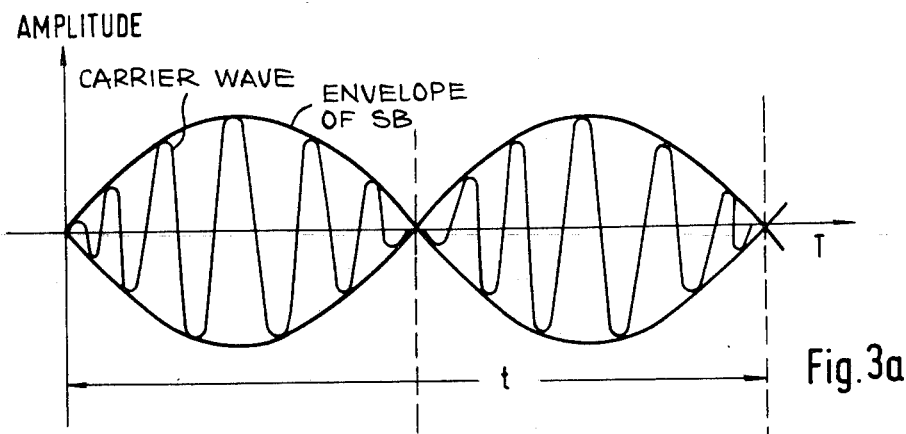
FIGS. 3a, 3b and 3c, show waveforms useful in explaining the phase regulation of the transmitter in accordance with the present invention.
Figure 3B:
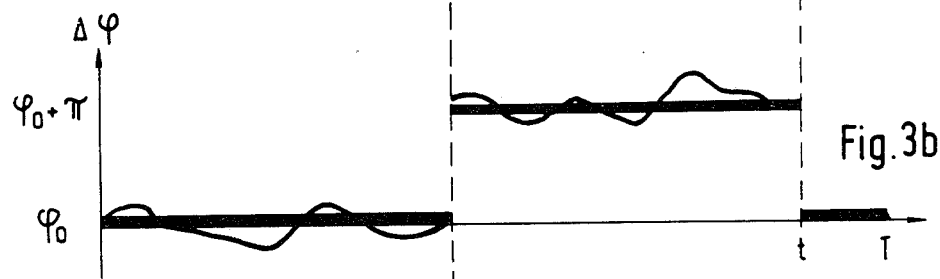
Figure 3C:
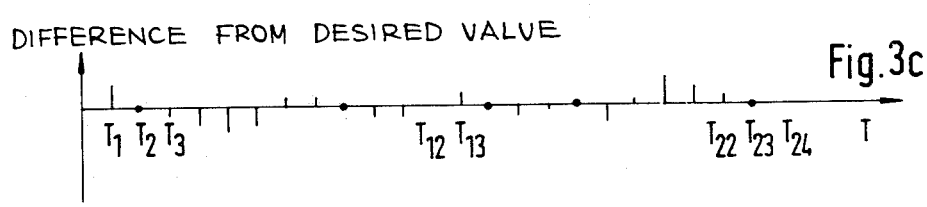

The variation of the phase difference is very slow. The values with which the controllable phase shifter 3 is controlled can, therefore, be calculated as follows:

The regulation takes place over several signal periods t. FIG. 3a shows the envelope and the carrier wave of the sideband signal for one signal period t. After t/2, a phase jump of $\pi$ takes place. During the first half of a signal period, the phase difference between the carrier waves of the carrier and the sideband signal is $\Psi_0$; during the second half, it is $\Psi_0 + \pi$. In FIG. 3b, the desired values are indicated by heavy lines. The fine lines give the measured phase differences. During each signal period, the difference between the measured value and the value stored in a memory is measured at a given point within a modulating-signal period (the point changes from one measurement to another). Depending on the measured difference, a correcting value is calculated and stored. In the simplified example of FIG. 3c, this occurs 24 times, and 24 signal periods are needed. The computer then causes the controllable phase shifter 3 to produce phase shifts such that the difference between the measured value and the desired value becomes zero. If the phase difference changes again in the course of time, the stored control values will be replaced by new control values. In the example shown, the controllable phase shifter 3 is controlled with new control values 24 times during a modulating-signal period. The design and control (e.g., of the reading of stored values and the writing of new values) will not be explained here because they are known to those skilled in the art.

The transmitter can be easily expanded in such a way that, in addition, the amplitudes of the sideband signals and the carrier are measured. The computer then compares the measures values with desired values and, depending on the result of the comparison, generates control values with which the gain of the power amplifier is controlled.

While we have described above the principles of our invention in connection with specific apparatus it is to be clearly understood that this description is made only by way of example and not as a limitation to the scope of our invention as set forth in the objects thereof and in the accompanying claims.

We claim:

1. In a transmitter for a navigation system transmitting at least a first signal and a second signal, said first signal and said second signal each including carrier waves having a fixed phase relationship with respect to each other, a phase regulator comprising:

at least two couplers each extracting a portion of a different one of said first and second signals;

first means having one input coupled to said two couplers on a time division multiplex basis and the other input alternately coupled to a source of reference signal and a quadrature version of said reference signal; and second means coupled to said first means to form a ratio of a first voltage obtained by mixing said first and second signals with said reference signal and a second voltage obtained by mixing said first and second signals with said quadrature version of said reference signal, said ratio determining a phase shift between said carrier waves of said first and second signals and a carrier wave of said reference signal, to calculate from said phase shift a phase difference between said carrier waves of said first and second signals, to compare said calculated phase difference to said fixed phase relationship and to produce a control quantity of the basis of said comparison to control the phase of said carrier wave of at least one of said first and second signals.

2. A phase regulator according to claim 1, wherein said first means includes a mixer.

3. A phase regulator according to claim 2, further including
third means coupled between said first means and said second means to digitize the output of said first means.

4. A phase regulator according to claim 3, wherein said third means is an analog-to-digital converter.

5. A phase regulator according to claims 1, 2, 3 or 4, wherein
said second means is a computer means.

6. A phase regulator according to claims 1, 2, 3 or 4, wherein
said second means is a microcomputer.

* * * * *